(12) United States Patent
McKown et al.

(10) Patent No.: US 9,024,739 B2
(45) Date of Patent: May 5, 2015

(54) HORN INPUT TO IN-VEHICLE DEVICES AND SYSTEMS

(71) Applicant: Guardity Technologies, Inc., Plano, TX (US)

(72) Inventors: Russell Carl McKown, Richardson, TX (US); Joseph Thomas Mader, Plano, TX (US); Thomas Edward Mader, Plano, TX (US)

(73) Assignee: Guardity Technologies, Inc., Plano, TX (US)

( * ) Notice: Subject to any disclaimer, the term of this patent is extended or adjusted under 35 U.S.C. 154(b) by 152 days.

(21) Appl. No.: 13/907,885

(22) Filed: Jun. 1, 2013

(65) Prior Publication Data

US 2013/0328671 A1  Dec. 12, 2013

Related U.S. Application Data

(60) Provisional application No. 61/658,613, filed on Jun. 12, 2012.

(51) Int. Cl.
*G08B 6/00* (2006.01)
*G09B 21/00* (2006.01)
*H04B 3/36* (2006.01)
*B60Q 5/00* (2006.01)
*G10K 9/18* (2006.01)

(52) U.S. Cl.
CPC ... *B60Q 5/00* (2013.01); *G10K 9/18* (2013.01)

(58) Field of Classification Search
USPC ......... 340/407.2, 425.5, 384.73, 692, 995.16; 381/107, 10, 94.3, 95, 91, 26
See application file for complete search history.

(56) References Cited

U.S. PATENT DOCUMENTS

| | | | |
|---|---|---|---|
| 6,118,888 A * | 9/2000 | Chino et al. .................. 382/118 |
| 6,549,757 B1 * | 4/2003 | Masse et al. ................ 455/67.13 |
| 2004/0081020 A1* | 4/2004 | Blosser et al. .................. 367/96 |
| 2005/0232411 A1* | 10/2005 | Srinivasan et al. ............ 379/413 |
| 2010/0260353 A1* | 10/2010 | Ozawa ......................... 381/94.3 |
| 2013/0328671 A1* | 12/2013 | McKown et al. .......... 340/425.5 |
| 2014/0087696 A1* | 3/2014 | Gressus et al. ................ 455/411 |
| 2014/0089116 A1* | 3/2014 | Argue et al. .................. 705/21 |
| 2014/0292501 A1* | 10/2014 | Lim et al. .................... 340/407.2 |
| 2014/0294201 A1* | 10/2014 | Johnson et al. ............... 381/107 |

OTHER PUBLICATIONS

David Erwin, Automatic Collision Notification and Vehicle Telematics Technical Information Document (TID), Jun. 1, 2007, NENA 07-504, Published by NENA.

(Continued)

*Primary Examiner* — Hoi Lau

(57) ABSTRACT

The present application provides a system, method and non-transitory computer readable medium that provides a means of using a vehicle horn as an inexpensive user input interface to serve the function of a simple push button switch for an in-vehicle device or system. The use of the vehicle horn as a user input interface to an in-vehicle device or system is novel. The description of example embodiments illustrates application details that take advantage of the properties of the vehicle horn sound to allow efficient processing that can be implemented on a low cost processor.

20 Claims, 8 Drawing Sheets

(56) References Cited

OTHER PUBLICATIONS

Tomas, Tvrzsky, Ertico—ITS Europe, D2.1 Fuctional and Operational requirements Report, Delivery date: Sep. 20, 2011.
Ching-Yao Chan, On the Detection of Vehicular Crashes—System Characteristics and Architechture, IEEE Transactions on Vehicular Technology, vol. 51, No. 1, Jan. 2002.
Douglas W Kononena, Carol A.C. Flannaganb, Stewart C Wangc, Accident Analysis and Prevention, Accepted Jul. 29, 2010, © 2010 Elsevier Ltd.
Tom Seekins (University of Montana), Alan Blatt (CUBRC). Marie Flanigan (CUBRC), Characterization of Pathways for Delivery of Crash Telemetry Data to Montana, Montana Automatic Crash Notification Project TechNote Deliverable for Revised Task 2 Version 2, Jul. 8, 2011.
Recommendations of the National Mayday Readiness Initiative, ComCare Alliance, US Department of Transporation, Oct. 23, 2000.

* cited by examiner

FIG. 3D

| Tone ID | Frequency (Hz) | Amplitude | Comment |
|---|---|---|---|
| a | Fa = 844 | 2100 | 2nd largest |
| b | Fb = 1270 | 2250 | largest |
| c | Fc = 1688 | 880 | Fc = 2*Fa |
| d | Fd = 2540 | 1530 | Fd = 2*Fb |
| e | Fe = 2960 | 760 | Fe − Fd ~ Fb − Fa |

HORN INPUT TO IN-VEHICLE DEVICES AND SYSTEMS

CROSS-REFERENCE TO RELATED APPLICATIONS

This application claims priority to U.S. provisional application No. 61/658,613, entitled "Horn Input to In-Vehicle Devices and System", filed Jun. 12, 2012. This application is related to commonly assigned application Ser. No. 13/276,991, entitled "Detecting a Transport Emergency Event and Directly Enabling Emergency Services", filed on Oct. 19, 2011, now issued U.S. Pat. No. 8,476,151, issued or Mar. 18, 2014, and U.S. application Ser. No. 13/907,880, entitled "Qualifying Automatic Vehicle Crash Emergency Calls to Public Safety Answering Points", filed on Jun. 1, 2013, and U.S. application Ser. No. 13/907,883, entitled "Qualifying Automatic Vehicle Crash Emergency Calls to Public Safety Answering Points", filed on Jun. 1, 2013, and U.S. application Ser. No. 13/907,887, entitled "Mounting Angle Calibration for an In-Vehicle Accelerometer Device", filed on Jun. 1, 2013, and U.S. application Ser. No. 13/907,889, entitled "Automatic Speech Message Validation of an Emergency Teletype Text Message", filed on Jun. 1, 2013. The contents of which are hereby incorporated by reference in their entireties.

FIELD OF THE APPLICATION

The present application relates to user input to transport systems and devices, in-vehicle data-acquisition systems and transport telematics devices; and more particularly, the use of the horn in a vehicle, or other form of transport, for user input to a device or system that is located in or on the transport.

BACKGROUND OF THE APPLICATION

In-vehicle devices and systems will refer herein to devices and systems that are installed on a vehicle. Aftermarket in-vehicle devices and systems will refer to devices and systems that are installed on a vehicle after the vehicle has been manufactured, i.e. these devices are not factory installed. Although this application description will focus on the use of the horn as an input interface to aftermarket telematics devices which are electronic devices, the application applies to in-vehicle devices and systems in general, aftermarket or factory installed, electronic or not. The application is not restricted to aftermarket devices and systems since embodiments of the application can be implemented at the vehicle manufacturing plant. However, as developed below, a definite need for the application is associated with certain unreadily accessible aftermarket devices and systems. Furthermore, the application is not restricted to vehicles since operators of other forms of transport use horns as a means of warning others or gaining attention to the transport operations and the application applies to these transports as well. The term 'vehicle' will be used for readability but should be interpreted as including these other forms of transport.

Vehicle telematics devices and systems employ telecommunications and information processing for a variety onboard functions and communication capabilities. Examples of vehicle telematics functions include emergency warning, GPS navigation, integrated hands-free cell phones, automatic crash notification, wireless safety communications, and automatic driving assistance. Several new car manufacturers offer factory-installed telematics systems in their new vehicles. For example, General Motors Corporations offers the OnStar® system, Ford Corporation offers the SYNC® system, and Hughes Telematics offers their system through OEM arrangements with manufactures such as Mercedes-Benz Corporation.

In addition, a growing aftermarket telematics device and system industry offers telematics devices for use in existing vehicles. These aftermarket telematics products enable the upgrade of older vehicles with similar telematics functions as those available on new cars. Additionally, these aftermarket telematics products may provide additional functions, for example fleet tracking, or the capture of vehicle telemetry data for usage based vehicle insurance rating. Examples of fleet tracking devices are available from CES Wireless Corporation and Sierra Wireless Corporation. The Snapshot® device from Progressive Insurance Company is a well-known telematics device for usage-based insurance. Like several of the newer aftermarket telematics products, the 'Snapshot' device plugs into and draws power from the vehicle's standardized on-board diagnostic port, referred to as an 'OBDII' connector. The OBDII plug-in devices provide a straightforward user installation. In comparison, several commercial fleet tracking devices are still rugged 'bricks' the size of a blackboard eraser or larger that are intended for professional installation involving more elaborate mechanical mountings and custom wiring.

The installation location of both factory installed and certain aftermarket devices and systems may not always fall within convenient arm's reach of the operator. For example, a device may be installed inside the dashboard of the vehicle. In the case of factory installed telematics systems, these concealed locations may not be problematic if a well-designed user interface is provided. Such a user interface may be readily integrated into the design of the dash or steering wheel, allowing for ergonomically placed controls or touch screen displays. Indeed, a quality user interface to factory installed telematics systems provides a valuable feature that may be used in marketing to enhance vehicle sales.

In the case of many aftermarket devices however, the concealed nature of the device installation is problematic to providing even a minimal user input interface. These types of aftermarket telematics systems, such as fleet tracking devices, automatic crash notification devices, and usage based insurance devices, would benefit from an accessible push button switch user input interface. These systems do not require a more elaborate interface such as a touch screen or keypad. For example, a push button switch user input interface is desirable so the driver can respond to synthesized voice prompts in order to configure or command the telematics system. Also, an un-prompted push button user input could serve as an emergency HELP/MAYDAY switch to initiate contact with a telematics service center or '911' emergency dispatch operator.

Note the terms 'switch', 'push button' and 'push button switch' are used interchangeably here and meant to include any type of binary or ON/OFF control signaling method that is easily and directly activated and/or inactivated by the user. An example of this type of switch is a push button near the overhead interior light in the passenger compartment of a vehicle that the occupants use to turn the light ON or OFF. The term 'user' here generally refers to the operator of the vehicle but may also include vehicle occupants.

Several undesirable systems and methods exist for providing a push button switch as a user input interface to an aftermarket device that is concealed from the user, for example a device that is under or inside the dash of the passenger compartment. One such method, for example, is to mount a switch somewhere on the dash and connect the switch to the device by means of wires or wireless signaling. This is undesirable cosmetically—very few vehicle owners want a button glued or otherwise attached to the dashboard of their vehicle. A remote wireless button creates the need for a power source, and if a battery is used for power, the requirement to replace or recharge the battery. Another approach that is also undesirable is to rewire an existing control on the dash so that it is wired to the aftermarket device instead of being wired by the car manufacturer. This approach would be difficult to implement, result in permanent vehicle damage, and may void the vehicle's warranty.

Voice activation may initially appear to be an attractive solution for providing a simple user input interface for an inaccessibly installed aftermarket device. However, the audio signal processing technology that is required to provide a reliable voice activation user interface has a large processing burden and may be difficult to economically justify. These telematics devices plug into the OBDII connector for device mounting, power source, and access to vehicle diagnostic data. Voice activation technology is superfluous for a simple push button switch type of user interface for these reduced cost telematics devices. For example, the push button switch may only be needed for user-aided configuration of the device and for providing the user with HELP/MAYDAY button functionality.

What would be optimal is an inexpensive and accessible user input interface for in-vehicle devices and systems that can serve the function of a simple push button switch. For example, this type of user interface is needed for low cost, user-installed, consumer-oriented, OBDII-mounted telematics devices. Such an interface will allow enhanced functionality, for example, by allowing the user to configure and command the device in response to audio prompts and by providing the user with a HELP/MAYDAY button function that can be used to obtain help in an emergency.

SUMMARY OF APPLICATION

The present application provides systems and methods that use a vehicle horn to provide an inexpensive user input interface that can serve the function of a push button switch for an in-vehicle device or system. Example embodiments contain a vehicle horn with a horn control button switch, a sound sensor, such as a microphone, and a sound processor. An example method makes use of a calibration phase and a sensing phase. During the calibration phase, horn sound data is acquired and processed to extract horn identification parameters. During the sensing phase, sound data is acquired and processed using the horn identification parameters. This sensing processing determines: 1) if the detected horn sound appears to match the one used for calibration, and 2) whether the vehicle driver is using the horn for normal alerting purposes to a third party, or to communicate with the in-vehicle device. In the latter case, the driver uses the vehicle horn to provide an effective push button input to the device.

FIGS. 1A and 1B diagram a system and method, respectively, of an example embodiment of the present application. The example system of the application diagrammed in FIG. 1A includes a horn sound generation apparatus, sound sensing and processing apparatus, and an optional voice prompt generation apparatus. The horn sound generation apparatus is a horn 110 that is activated by a vehicle horn switch 120 that the driver uses to honk the horn. The sound sensing apparatus consists of a sound sensor 130 and a sound processor 140. The voice prompt generator apparatus 150, for example, may be an audio player of prerecorded voice recordings. In some embodiments the sound sensor 130, the sound processor 140 and the voice prompt generator 150 may reside in the in-vehicle device 155 as shown in FIG. 1A. Alternatively, these apparatus elements in other embodiments (not shown) may be external to the in-vehicle device and the decision for Push Button ON/OFF 145 may be communicated with the device via well-known wireline or wireless techniques, for example by means of a Bluetooth wireless link.

The example method of the application diagrammed in FIG. 1B, consists of the Acquisition of Sound Sensor Data process 155 which involves sampling data from the sound sensor 130, the process called Calibration Phase Horn Sound Acquisition and Processing 160 which determines the Horn Identification Calibration Parameters 170 and the process called Sensing Phase Sound Acquisition and Processing 180 which uses the Horn Identification Calibration Parameters 170 and determines a decision for Push Button ON/OFF 190. In preferred embodiments, the signal processing in the calibration phase analyzes the harmonic nature of the user's vehicle horn sound to parametrically characterize the harmonics in the sound. The signal processing in the sensing phase then uses these parameters to detect the presence or absence of a sound with the same parametrically defined harmonics.

In one example embodiment of the application, the in-vehicle device 155 of FIG. 1A is an aftermarket telematics device that plugs into the vehicle's OBDII diagnostic port and performs automatic crash notification (ACN). Such a telematics device is described in U.S. patent application Ser. No. 13/276,991 titled "Detecting a Transport Emergency Event and Directly Enabling Emergency Services" which is incorporated in its entirety by reference herein. In this example embodiment, during the calibration phase the driver is instructed to "depress the horn for 4 seconds" after which the device may report that it is 'calibrated and active'. The amount of time the horn should be depressed for calibration and activation can be less or more than 4 seconds. If the active ACN device sometime later detects a relatively minor, low speed vehicle crash, the device may issue voice prompts to the driver, "depress the horn for 4 seconds if you want to call the 911 operator." If he or she does, a 911 call is immediately placed. Many other use cases are available for even this one example embodiment of the application.

One example embodiment may provide a method that includes generating a prompt to initiate a sound signal, receiving the sound signal responsive to generating the prompt, recording the sound signal in memory, computing a power spectral density of the sound signal, determining a sound start-up point and a sound drop-off point of the sound signal based on signal power identified from the computed power spectral density, utilizing a plurality of components of the power spectral density of the sound signal between the sound start-up and the sound drop-off points to create a set of sound calibration parameters, and processing subsequent sound signals with the calibration parameters to determine if they are comparable to the sound signal.

Another example embodiment may provide an apparatus that includes a processor configured to generate a prompt to initiate a sound signal, a receiver configured to receive the sound signal responsive to the generated prompt, a memory configured to record the sound signal, a processor configured to compute a power spectral density of the sound signal, determine a sound start-up point and a sound drop-off point of the sound signal based on signal power identified from the computed power spectral density, utilize a plurality of components of the power spectral density of the sound signal between the sound start-up and sound drop-off points to create a set of sound calibration parameters, and process subsequent sound signals the calibration parameters to determine if they are comparable to the sound signal.

Another example embodiment may provide a non-transitory computer readable storage medium configured to store instructions that when executed cause a processor to perform generating a prompt to initiate a sound signal, receiving the sound signal responsive to generating the prompt, recording the sound signal in memory, computing a power spectral density of the sound signal, determining a sound start-up point and a sound drop-off point of the sound signal based on signal power identified from the computed power spectral density, utilizing a plurality of components of the power spectral density of the sound signal between the sound start-up and sound drop-off points to create a set of sound calibration parameters, and processing subsequent sound signals with the calibration parameters to determine if they are comparable to the sound signal.

BRIEF DESCRIPTION OF THE DRAWINGS

FIG. 3D illustrates the horn calibration parameters in an example embodiment of the application.

DETAILED DESCRIPTION OF THE APPLICATION

The present application provides a system, method and non-transitory computer readable medium that provides using a vehicle horn as an inexpensive user input interface to serve the function of a simple push button switch for an in-vehicle device or system. The use of the vehicle horn as a user input interface to an in-vehicle device or system is novel. This description of example embodiments illustrates application details that take advantage of the properties of the vehicle horn sound to allow efficient processing that can be implemented on a processor (such as a low cost processor). Given these examples, many other embodiments are obvious to one skilled in the art.

Figure 2:
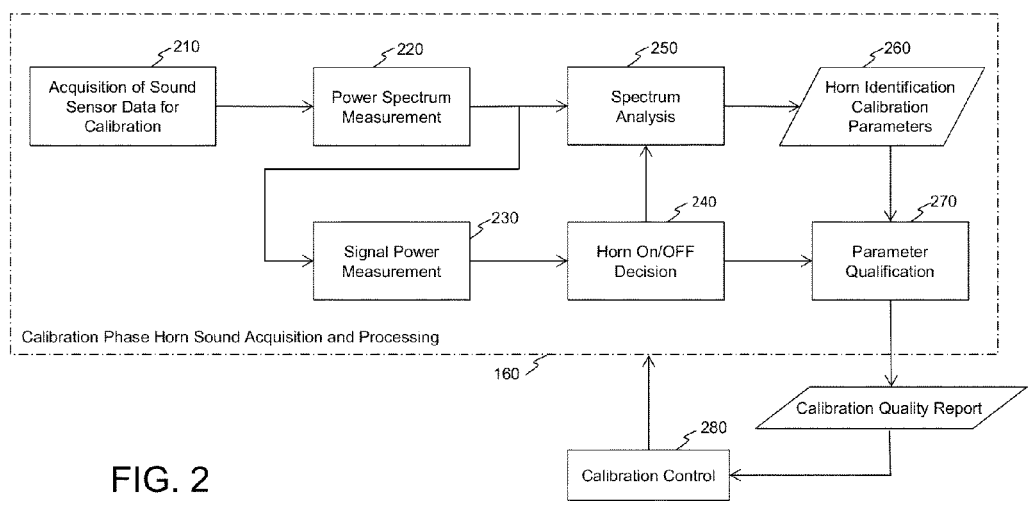
FIG. 2 is a diagram of the calibration phase of an example embodiment of the application.

FIG. 2 is a diagram of an example embodiment of the calibration phase horn sound acquisition and processing 160 of the application. In this embodiment, under the control of the calibration control module 280, the beginning of the Acquisition of Sound Sensor Data for Calibration 210 occurs when the operator is issued the "depress the horn for 4 seconds" voice prompt. The calibration process may continue monitoring the sound sensor for a pre-determined duration, for example, 6 seconds after the prompt is played. Note here and elsewhere that the voice prompt is a preferred but optional means of prompting the user. Other well-known user prompt methods and apparatus which may be used include, for example, a processor generated beep sound or blinking light, the meaning of which might be explained in a user manual or training video. For readability, this description will henceforth refer only to the voice prompt implementation.

Figure 3A:
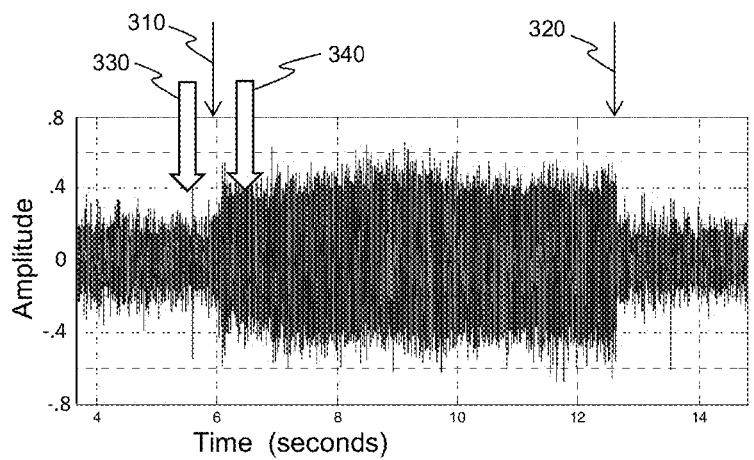
FIG. 3A illustrates an example amplitude versus time plot of horn sound data acquired for calibration in an example embodiment of the application using an analog-to-digital converter when considerable background noise is present.

FIG. 3A illustrates an example amplitude versus time plot of sound data acquired for calibration using an analog-to-digital converter with a sample rate of 8000 samples per second. In this example, although there is considerable background noise, it is still apparent that the horn goes ON at the first narrow arrow 310 and goes OFF at the second narrow arrow 320. This example horn data is from a 2001 Chevrolet Tahoe parked near a busy road.

Figure 3B:
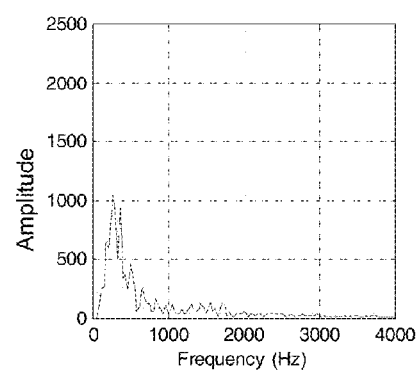
FIG. 3B and FIG. 3C are power spectral density (PSD) estimates in an example embodiment of the application before and after the user depresses the horn button, respectively.
Figure 3C:
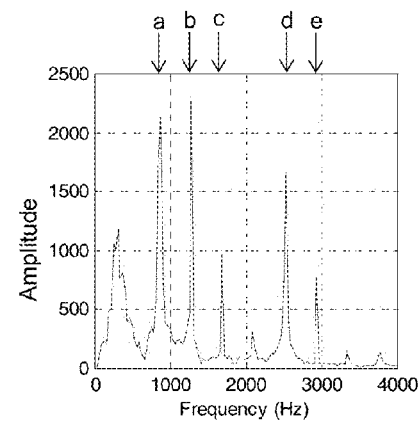

Referring to FIG. 2, the sound data is input to a Power Spectrum Measurement function 220 which computes a sequence of power spectral density (PSD) estimates, where each PSD provides amplitude versus frequency information. For example, well known methods exist for using Fast Fourier Transform (FFT) algorithms to efficiently compute PSD estimates for sampled and digitized data. FIGS. 3B and 3C are PSD estimates computed using FFT techniques on data that is located as indicated by the broad arrows 330 and 340, respectively in FIG. 3A. FIG. 3B is computed from sound data that was acquired before the user depressed the horn button and shows the spectrum of the background noise. FIG. 3C is computed from sound data that was acquired with the horn ON. It is clear from comparing FIGS. 3A, 3B and 3C that the horn being ON is easier to see in the computed PSD amplitude versus frequency data than the original amplitude versus time sampled sound data.

Referring again to FIG. 2, it is for this reason (e.g., that the horn being ON is readily apparent in the PSD data) that a Signal Power Measurement 230 inputs the PSD data from the Power Spectrum Measurement 220 and that a subsequent Horn ON/OFF Decision 240 is based on the signal power measurement from PSD data. An example of a simple signal power measurement algorithm that is suitable here is to take the average of the 10 largest amplitude PSD bins above some moderately low frequency, for example 500 Hz. (For example if there were only 7 bins above some frequency and if these 7 bins were represented by the vector PSDbins=[988 25 44 82 720 51 6 33] then the average of the 2 largest bins is (988+720)/2=854.) For the data shown in FIGS. 3B and 3C, this provides signal power measurements of 188 and 1163, respectively. The Horn ON/OFF Decision 240 would then be accurate using a threshold of 500, for example. It is well known to those skilled in the art that many other reliable approaches exist (such as simply summing all of the PSD bins above 500 MHz) for making a horn ON/OFF decision given sound data recorded in a short duration observation window immediately following a prompt for the user to honk the horn. The calibration phase Horn ON/OFF Decision 240 has the advantage that during calibration the user may be encouraged to reduce the ambient sound noise.

Referring again to FIG. 2, the Horn ON/OFF Decision 240 is input to the Spectrum Analysis 250 which also inputs the sequential PSD data vectors from the Power Spectrum Measurement 220. For example, given a sound data sample rate of 8000 samples per second and block processing FFT based PSD measurement with block size of 512 real sound samples and an FFT size of NFFT=256, the Spectrum Analysis 250 may input a new 128 element PSD data vector every 64 milliseconds. The PSD data vectors displayed in FIGS. 3B and 3C are examples of such PSD data vectors. An example embodiment of the Spectrum Analysis 250 processing is to simply determine the frequency and amplitude of the M largest 'tones', e.g., sharp spectral features, for frequencies above some moderately low frequency, for example 500 Hz. Since individual tones may span multiple PSD frequency bins this separated tone processing is different than determining the M largest PSD data elements, as is well known (The M largest PSD elements may contain bins that are adjacent and hence do not belong to separate tones.) The Spectrum Analysis 250 in this example embodiment may then output the frequency and amplitude data of the M largest tones as the Horn Identification Calibration Parameters 260.

FIG. 3D illustrates the Horn Identification Calibration Parameters 260 for a version of this example embodiment wherein the Spectrum Analysis 250 simply records the frequency and amplitude parameters M=5 largest separated tones. The 5 largest tones are identified by the letters "a" to "e" in both FIGS. 3C and 3D. The data in the frequency and amplitude columns of the table in FIG. 3D constitute the Horn Identification Calibration Parameters 260.

It is observed in practice that for horn sounds of several seconds, the PSD data is nearly stationary for some vehicle horns but slowly changing for other vehicle horns. Both of these types of observed vehicle horns are in agreement with the vehicle horn model of Guillaume Lemaitre, Patrick Susini, Suzanne Winsberg, Stephen McAdams in "*The Sound Quality of Car Horns: Designing New Representative Sounds*", Acta Acustica united with Acustica, Vol. 95 (2009). The slowly changing, non-stationary vehicle horns motivate taking multiple sets of measurements during the calibration horn sound. For example, the frequency and amplitude data of the M largest tones can be measured every half second for a 4-second calibration horn sound. In this case, the Horn Identification Calibration Parameters 260 consists of N=8 sequential sets of frequency and amplitude data. The total number of parameters to be stored in the Horn Identification Calibration Parameters 260 for M=5 is then N*M*2 or 8*5*2=80 parameters each of which can be stored in 2 bytes for a small total parameter storage requirement of 160 bytes.

Note that the realization that vehicle horn sound recognition can be based on a relatively simple analysis, for example, of efficiently computed power spectral density data, is one aspect of the application. Sound recognition in general, however, is like speech recognition in that it can be both algorithmically and computationally demanding as discussed, for example, by Michael Cowling and Renate Sitte in the article "*Analysis of Speech Recognition Techniques for use in a Non-Speech Sound Recognition System*", in Proceedings 6th International Symposium on Digital Signal Processing for Communication Systems, (2002) and in the article "*Comparison of Techniques for Environmental Sound Recognition*", in Pattern Recognition Letters 24 (2003). Using the vehicle horn as a user input to provide the function of a push button switch for in-vehicle devices is attractive in part due to the relatively straightforward signal processing required for horn sound recognition and the ability to do this processing with a low percentage of the total computational capacity of an inexpensive embedded processor.

Figure 1A:
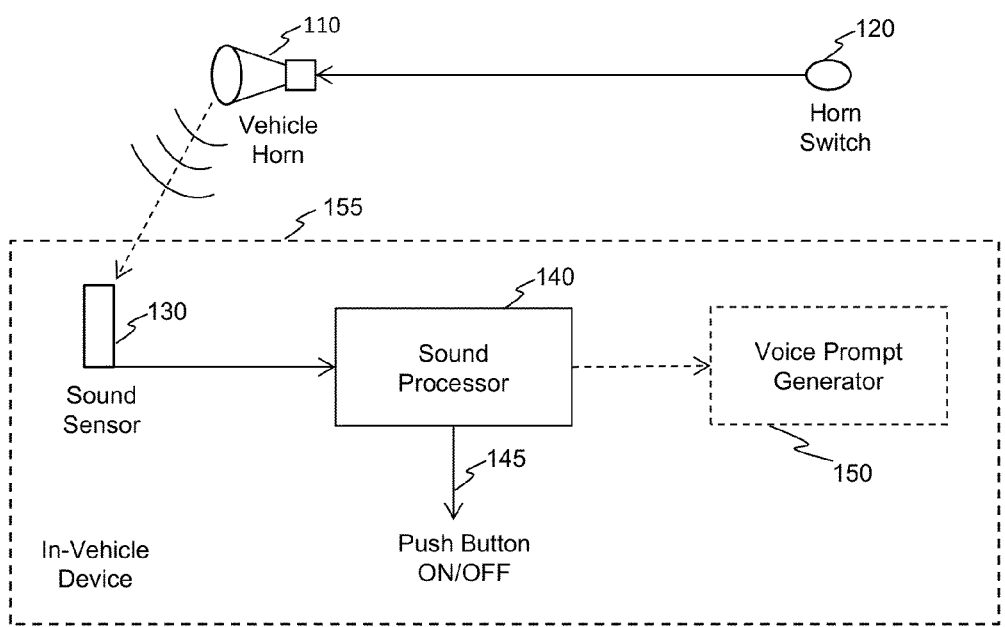
FIG. 1A depicts a diagram of an example system of the application that consists of horn generation apparatus, sound sensing and processing apparatus and an optional voice prompt generation apparatus.
Figure 1B:
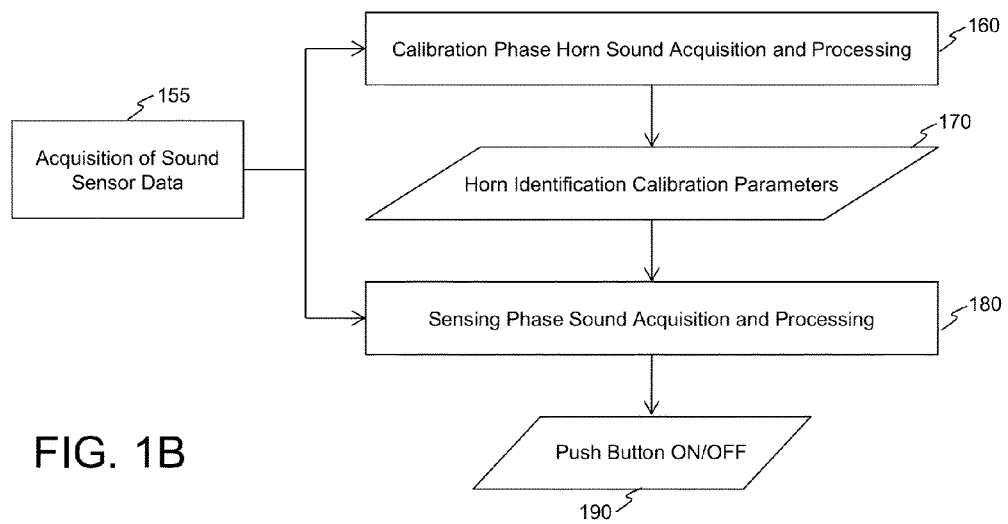
FIG. 1B depicts a diagram of the method of the application that consists of a calibration phase and a sensing phase.

Referring again to FIG. 2, the diagrammed example embodiment of the Calibration Phase Horn Sound Acquisition and Processing 160 also includes a Parameter Qualification 270 that inputs the Horn Identification Calibration Parameters 260 and the signal detection information from Horn ON/OFF Decision 240. The Parameter Qualification 270 decides if the calibration is satisfactory and, in this example embodiment, provides a Calibration Quality Report as output to the Calibration Control module 280. For example, the Calibration Quality Report may, based on the signal detection information from Horn ON/OFF Decision 240, indicate that the horn was not properly held continuously ON as requested or that the background noise level needs to be reduced. Alternatively, the Calibration Quality Report may ask for a repeat calibration based on the absence of any harmonic relationships between the M=5 largest tones in the Horn Identification Calibration Parameters 260. Note the comments in FIG. 3D for examples of the expected harmonic nature of a vehicle horn sound. Typically, if none of the higher frequency tones have frequencies that are multiples of one of the two lowest frequency tones then the calibration is suspect and deserves to be repeated. If upon repetition of the calibration process, the data in the Horn Identification Calibration Parameters 260 are reproduced within the expected variability, then the calibration may be trusted. Upon successful completion of the calibration phase, the sound processor and voice prompt apparatus of FIG. 1A may report to the user that "horn input (to the in-vehicle device) is calibrated and active".

Figure 4:
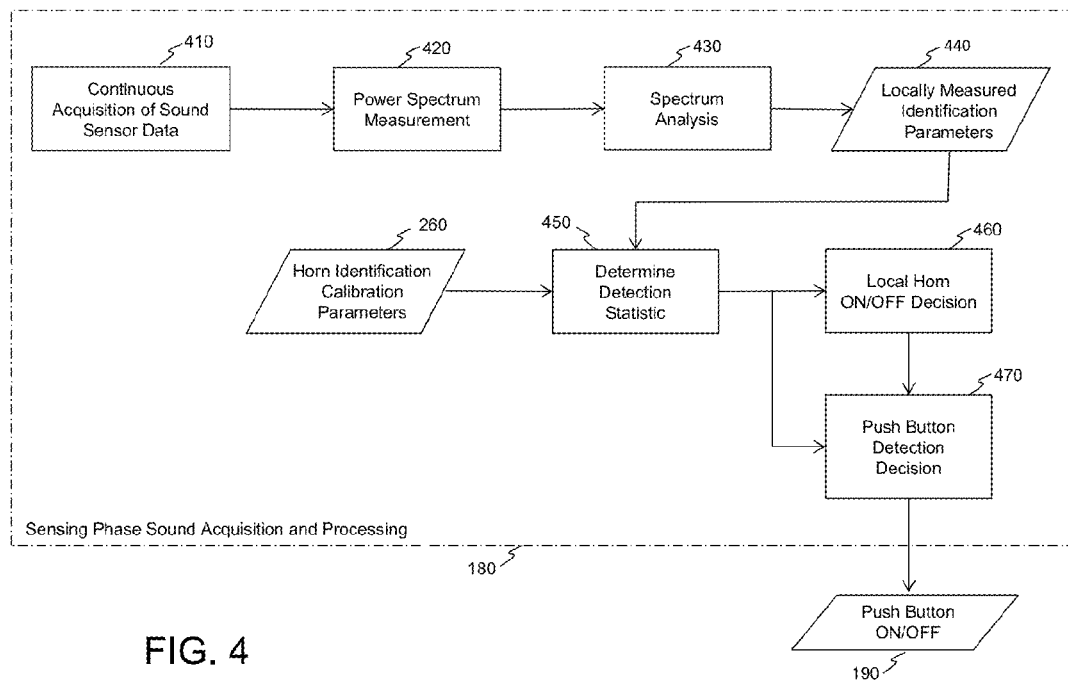
FIG. 4 is a diagram of the sensing phase of an example embodiment of the application.

FIG. 4 is a diagram of an example embodiment of the Sensing Phase Sound Acquisition and Processing 180 of the application. In this example, sound data may be continuously acquired by Continuous Acquisition of Sound Sensor Data 410 and processed by the Power Spectrum Measurement 420 which may be identical to the Power Spectrum Measurement 220 of FIG. 2. The PSD data from 420 is then input to a Spectrum Analysis element 430, which is similar to the Spectrum Analysis 250 in FIG. 2 that is described above for the calibration phase processing. An important difference is that the Spectrum Analysis 430 has no prior knowledge that the horn is ON or OFF and simply outputs a sequence of Locally Measured Identification Parameters 440. Indeed, this sequence of parameters usually corresponds to sound sensor data that is acquired when the horn is OFF. The parameter extraction algorithm that the Spectrum Analysis 430 uses to process the PSD data vectors during sensing is defined by the parameter extraction algorithm that the Spectrum Analysis 250 uses to process the PSD data vectors during calibration.

Note that in this example embodiment, the Power Spectrum Measurement elements 220 and 420 are block processing, since they calculate a PSD using FFT techniques. For example, these processing elements may output a 128 length PSD data vector every 64 milliseconds. The subsequent sensing phase processing elements 430, 440, 450, 460 and 470 in FIG. 4 are intended to operate at the same rate as 420, i.e., they may also execute every 64 milliseconds in this example embodiment.

Referring to FIG. 4, in this example embodiment of the Sensing Phase Sound Acquisition and Processing 180, a Determine Detection Statistic element 450 inputs both the Horn Identification Calibration Parameters 260 that were determined during the calibration phase and the Locally Measured Identification Parameters 440. The Determine Detection Statistic processing element 450 executes an algorithm for computing a detection statistic. The detection statistic algorithm is preferably motivated by some statistical detection theory so that the numerical value of the statistic is useful for determining whether the horn is ON (or OFF). A suitable reference on detection theory is *Fundamentals of Statistical Signal Processing, Volume 2: Detection Theory*, by Steven M. Kay, Prentice Hall (1998).

For example, a simple approach that is consistent with the traditional Gaussian detection theory and the linear horn model of the Lemaitre et al. and the linear FFT processing is to define the processing of the Determine Detection Statistic module 450 in terms of a simple spectral amplitude matched filter. In this example embodiment, the N sets of M PSD amplitude values at the M frequencies are such that the M frequencies are the kept the same for all N sets that constitute the Horn Identification Calibration Parameters 260, and we notate these amplitude values as N M-element vectors HICP (n) where n=1:N. Furthermore, the Locally Measured Identification Parameters 440 consists of M PSD amplitude values at these same M frequencies, and we notate these amplitude values as the M-element vector LMIP. A suitable detection statistic is then defined by the maximum of N vector dot products of LMIP and HICP(n) for n=1:N. The processing sequence of this detection statistic can then be written D(k)=max {HICP(n)*LMIP(k)|n=1:N}; where D(k) is the detection statistic for block processing index k=1, 2, 3, . . . ; which in the example embodiment represents the sequence of blocks that are separated by 64 milliseconds of time. HICP(n) is an M element vector containing the $n^{th}$ set of amplitudes in the Horn Identification Calibration Parameters 260; LMIP(k) is an M element vector defined by the Locally Measured Identification Parameters 440 for the $k^{th}$ processing block; the * represents vector dot product which is an element by element multiplication with summation over the products; and the max {|n=1:N} indicates the maximum with respect to the N sets of M PSD amplitude values in the calibration data in Horn Identification Calibration Parameters 260.

Referring again to FIG. 4, in this example embodiment of the Sensing Phase Sound Acquisition and Processing 180, a Local Horn ON/OFF Decision processing element 460 inputs the sequence of detection statistics D(k) for k=1, 2, 3 . . . and for each processing block k makes a decision as to whether the vehicle horn is ON or OFF. For example the detection statistic D(k) can be compared to a threshold T and the horn is decided to be ON if D(k)>T and is decided to be OFF otherwise. The threshold T may be preset or determined during the calibration phase and included in the Horn Identification Calibration Parameters 260.

Referring to FIG. 4, in this example embodiment of the Sensing Phase Sound Acquisition and Processing 180, a Push Button Detection Decision 470 inputs the sequence of detection statistics D(k) for k=1, 2, 3 . . . from the Determine Detection Statistic 450 and also inputs the sequence of local horn ON or OFF decisions from Local Horn ON/OFF Decision 460. The Push Button Detection Decision 470 makes the decision on whether the vehicle operator has used the horn to communicate 'push button' to the in-vehicle device and outputs this decision as shown in FIG. 4. For example, Push Button Detection Decision 470 may analyze the variability of the detection statistic D(k) sequence to determine an effective signal to noise ratio (SNR) for this statistic as SNR=mean{D(k)|k=1, 2, 3 . . . }/std{D(k)|k=1, 2, 3 . . . }; which is the ratio of the mean of the D(k) sequence to the standard deviation of the D(k) sequence. If this SNR measurement is below some threshold Tsnr, then the decision is that the 'button' has not been pushed. The sequence of local horn ON or OFF decisions may also disqualify the 'button pushed' from being decided to be true, based on the duration of the horn sound being too short. A "4" second duration horn sound is required for the 'button pushed' hypothesis to be decided true.

Figure 5:
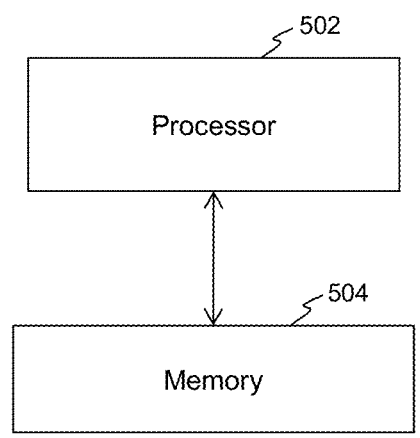
FIG. 5 depicts a diagram of a processor and a connected memory that can be resident on one or more of the devices or modules according to an embodiment of the application.

Note that any reference to an algorithm described or depicted herein is software or a computer program that is run by a processor resident on one or more devices or modules described or depicted herein. FIG. 5 depicts a processor 502 and a connected memory 504 that can be resident on any of the devices described or depicted herein, for example the In-Vehicle Device diagramed in FIG. 1A.

A novel use of the vehicle horn as a user input interface to an in-vehicle device has been described. The above example embodiment illustrates application details that take advantage of the properties of the vehicle horn sound to allow efficient processing that can be implemented on a low cost processor. Several of the individual process modules in both the calibration phase diagrammed in FIG. 2 and the sensing phase and the calibration phase diagrammed in FIG. 4 may be combined or further distributed. For example in the calibration phase of FIG. 2, the Signal Power Measurement and Horn ON/OFF Decision modules may be considered part of the Signal Analysis module. Many other embodiments of both the calibration phase processing and the sensing phase processing should be obvious to one skilled in the art.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium (non-transitory storage medium) may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the systems can be performed by one or more of the operations or components described herein or in a distributed architecture and may include a transmitter, receiver or pair of both. For example, all or part of the functionality performed by the individual operations, may be performed by one or more of these operations. Further, the functionality described herein may be performed at various times and in relation to various events, internal or external to the operations or components. Also, the information sent between various operations can be sent between the operations via at least one of: a data network, the Internet, a voice network, an Internet Protocol network, a wireless device, a wired device and/or via plurality of protocols. Also, the messages sent or received by any of the operations may be sent or received directly and/or via one or more of the other operations.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as operations, in order to more particularly emphasize their implementation independence. For example, a operation may be implemented as a hardware circuit comprising custom very large scale integration (VLSI) circuits or gate arrays, off-the-shelf semiconductors such as logic chips, transistors, or other discrete components. A operation may also be implemented in programmable hardware devices such as field programmable gate arrays, programmable array logic, programmable logic devices, graphics processing units, or the like.

A operation may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified operation need not be physically located together, but may comprise disparate instructions stored in different locations which, when joined logically together, comprise the operation and achieve the stated purpose for the operation. Further, operations may be stored on a computer-readable medium, which may be, for instance, a hard disk drive, flash device, random access memory (RAM), tape, or any other such medium used to store data.

Indeed, a operation of executable code could be a single instruction, or many instructions, and may even be distributed over several different code segments, among different programs, and across several memory devices. Similarly, operational data may be identified and illustrated herein within operations, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   generating a prompt to initiate a sound signal;
   receiving the sound signal responsive to generating the prompt;
   recording the sound signal in memory;
   computing a power spectral density of the sound signal;
   determining a sound start-up point and a sound drop-off point of the sound signal based on signal power identified from the computed power spectral density;
   utilizing a plurality of components of the power spectral density of the sound signal between the sound start-up point and the sound drop-off point to create a set of sound calibration parameters; and
   processing subsequent sound signals with the sound calibration parameters to determine if they are comparable to the sound signal.

2. The method of claim 1, wherein the power spectral density is computed by using a fast Fourier transform (FFT) performed on the sound signal.

3. The method of claim 1, wherein the sound signal is a motor vehicle horn sound that is recorded for a predetermined amount of time.

4. The method of claim 1, further comprising:
   identifying a frequency and an amplitude of M largest tones of the sound signal, the M largest tones identified as being a predefined number of sound signal components above a predetermined fundamental low frequency; and
   designating the M largest tones as horn identification calibration parameters.

5. The method of claim 4, further comprising:
   measuring the frequency and the amplitude of the M largest tones of the sound signal for a predetermined number of times per second over a predefined time frame.

6. The method of claim 5, wherein the predetermined number of times per second is two times per second and the predefined time frame is four seconds.

7. The method of claim 2, further comprising:
   comparing a sequence of detection statistics to a predetermined detection threshold; and
   determining whether the motor vehicle horn sound is on or off based on the comparison.

8. An apparatus comprising:
   a processor configured to generate a prompt to initiate a sound signal;
   a receiver configured to receive the sound signal responsive to the generated prompt;
   a memory configured to record the sound signal;
   a processor configured to
      compute a power spectral density of the sound signal,
      determine a sound start-up point and a sound drop-off point of the sound signal based on signal power identified from the computed power spectral density,
      utilize a plurality of components of the power spectral density of the sound signal between the sound start-up points and sound drop-off point to create a set of sound calibration parameters, and
      process subsequent sound signals with the sound calibration parameters to determine if they are comparable to the sound signal.

9. The apparatus of claim 8, wherein the power spectral density is computed by using a fast Fourier transform (FFT) performed on the sound signal.

10. The apparatus of claim 8, wherein the sound signal is a motor vehicle horn sound that is recorded for a predetermined amount of time.

11. The apparatus of claim 8, wherein the processor is further configured to identify a frequency and an amplitude of M largest tones of the sound signal, the M largest tones identified as being a predefined number of sound signal components above a predetermined fundamental low frequency, and designate the M largest tones as horn identification calibration parameters.

12. The apparatus of claim 11, wherein the processor is further configured to measure the frequency and the amplitude of the M largest tones of the sound signal for a predetermined number of times per second over a predefined time frame.

13. The apparatus of claim 12, wherein the predetermined number of times per second is two times per second and the predefined time frame is four seconds.

14. The apparatus of claim 9, wherein the processor is further configured to compare a sequence of detection statistics to a predetermined detection threshold, and determine whether the motor vehicle horn sound is on or off based on the comparison.

15. A non-transitory computer readable storage medium configured to store instructions that when executed cause a processor to perform:
    generating a prompt to initiate a sound signal;
    receiving the sound signal responsive to generating the prompt;
    recording the sound signal in memory;
    computing a power spectral density of the sound signal;
    determining a sound start-up point and a sound drop-off point of the sound signal based on signal power identified from the computed power spectral density;
    utilizing a plurality of components of the power spectral density of the sound signal between the sound start-up point and the sound drop-off point to create a set of sound calibration parameters; and
    process subsequent sound signals with the sound calibration parameters to determine if they are comparable to the sound signal.

16. The non-transitory computer readable storage medium of claim 15, wherein the power spectral density is computed by using a fast Fourier transform (FFT) performed on the sound signal.

17. The non-transitory computer readable storage medium of claim 15, wherein the sound signal is a motor vehicle horn sound that is recorded for a predetermined amount of time.

18. The non-transitory computer readable storage medium of claim 15, wherein the processor is further configured to perform:
    identifying a frequency and an amplitude of M largest tones of the sound signal, the M largest tones identified as being a predefined number of sound signal components above a predetermined fundamental low frequency; and
    designating the M largest tones as horn identification calibration parameters.

19. The non-transitory computer readable storage medium of claim 18, wherein the processor is further configured to perform:
    measuring the frequency and the amplitude of the M largest tones of the sound signal for a predetermined number of times per second over a predefined time frame.

20. The non-transitory computer readable storage medium of claim 19, wherein the predetermined number of times per second is two times per second and the predefined time frame is four seconds.

* * * * *